US010922385B2

(12) United States Patent
Young et al.

(10) Patent No.: US 10,922,385 B2
(45) Date of Patent: Feb. 16, 2021

(54) GENERATING LICENSE FILES IN AN INFORMATION HANDLING SYSTEM

(71) Applicant: DELL PRODUCTS, L.P., Round Rock, TX (US)

(72) Inventors: Jason M. Young, Round Rock, TX (US); Wayne R. Weilnau, Austin, TX (US); Marshal F. Savage, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 179 days.

(21) Appl. No.: 15/667,233

(22) Filed: Aug. 2, 2017

(65) Prior Publication Data

US 2019/0042707 A1 Feb. 7, 2019

(51) Int. Cl.
*G06F 21/10* (2013.01)
*G06F 21/33* (2013.01)
*G06F 21/60* (2013.01)

(52) U.S. Cl.
CPC ............ *G06F 21/105* (2013.01); *G06F 21/33* (2013.01); *G06F 21/602* (2013.01); *G06F 21/604* (2013.01)

(58) Field of Classification Search
CPC ...... G06F 21/105; G06F 21/33; G06F 21/602; G06F 21/604
See application file for complete search history.

(56) References Cited

U.S. PATENT DOCUMENTS

| 7,680,742 | B1 | 3/2010 | Ackerman et al. |
| 2005/0149733 | A1 | 7/2005 | Catherman et al. |
| 2011/0255690 | A1* | 10/2011 | Kocher ............... G06F 21/10 380/210 |
| 2014/0344159 | A1* | 11/2014 | Savage ............... G06Q 99/00 705/59 |

* cited by examiner

*Primary Examiner* — Noura Zoubair
(74) *Attorney, Agent, or Firm* — Isidore PLLC (57) ABSTRACT

A method, an information handling system (IHS) and a license file generating system for generating a license file. The method includes receiving, via a processor of a first information handling system (IHS), a plurality of input parameters associated with a product and generating license data at least partially based on the input parameters. The license data is transmitted to a hardware security module (HSM). The method further includes triggering the HSM to retrieve a certificate containing allowable use data. The allowable use data at least partially identifies a permitted installation of a license for the product. The HSM is triggered to embed a signer identifier within the certificate and the HSM is triggered to sign the certificate. The method further includes receiving a signed certificate from the HSM and generating a license file including the license data and the signed certificate. The license file is transmitted to a second IHS.

18 Claims, 8 Drawing Sheets

GENERATING LICENSE FILES IN AN INFORMATION HANDLING SYSTEM

BACKGROUND

1. Technical Field

The present disclosure generally relates to information handling systems and in particular to generating license files in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An original equipment manufacturer (OEM) of information handling systems may attach the information handling system or software components of the system to a license key to prevent an unauthorized user from using the information handling system or the software components without a license. Unfortunately, if the information handling system is manufactured by a sub-contractor, an unauthorized party may be able to obtain a copy of the license generator and signing key that enable the unauthorized party to generate and sell licenses.

BRIEF SUMMARY

Disclosed are a method, an information handling system (IHS), and a license file generation system for generating license files.

According to one embodiment, the method includes receiving, via a processor of a first IHS, a plurality of input parameters associated with a product and generating license data at least partially based on the input parameters. The license data is transmitted to a hardware security module (HSM). The method further includes triggering the HSM to retrieve a certificate containing allowable use data. The allowable use data at least partially identifies a permitted installation of a license for the product. The HSM is triggered to embed a signer identifier within the certificate and the HSM is triggered to sign the certificate. The method further includes receiving a signed certificate from the HSM and generating a license file including the license data and the signed certificate including the allowable use data. The license file is transmitted to a second IHS.

According to another embodiment, the IHS includes a processor of a first IHS communicatively coupled to a first memory device and to a hardware security module (HSM). The processor has software executing thereon for generating a license file. The software configures the processor to receive a plurality of input parameters associated with a product and to generate license data at least partially based on the input parameters. The license data is transmitted to a hardware security module (HSM). The processor triggers the HSM to retrieve a certificate containing allowable use data. The allowable use data at least partially identifies a permitted installation of a license for the product. The processor triggers the HSM to embed a signer identifier within the certificate and the HSM is triggered to sign the certificate. The processor receives a signed certificate from the HSM and generates a license file including the license data and the signed certificate including the allowable use data. The license file is transmitted to a second IHS.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, an information handling system (IHS), and a license file generation system.

The method includes receiving, via a processor of a first IHS, a plurality of input parameters associated with a product and generating license data at least partially based on the input parameters. The license data is transmitted to a hardware security module (HSM). The method further includes triggering the HSM to retrieve a certificate containing allowable use data. The allowable use data at least partially identifies a permitted installation of a license for the product. The HSM is triggered to embed a signer identifier within the certificate and the HSM is triggered to sign the certificate. The method further includes receiving a signed certificate from the HSM and generating a license file including the license data and the signed certificate including the allowable use data. The license file is transmitted to a second IHS.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
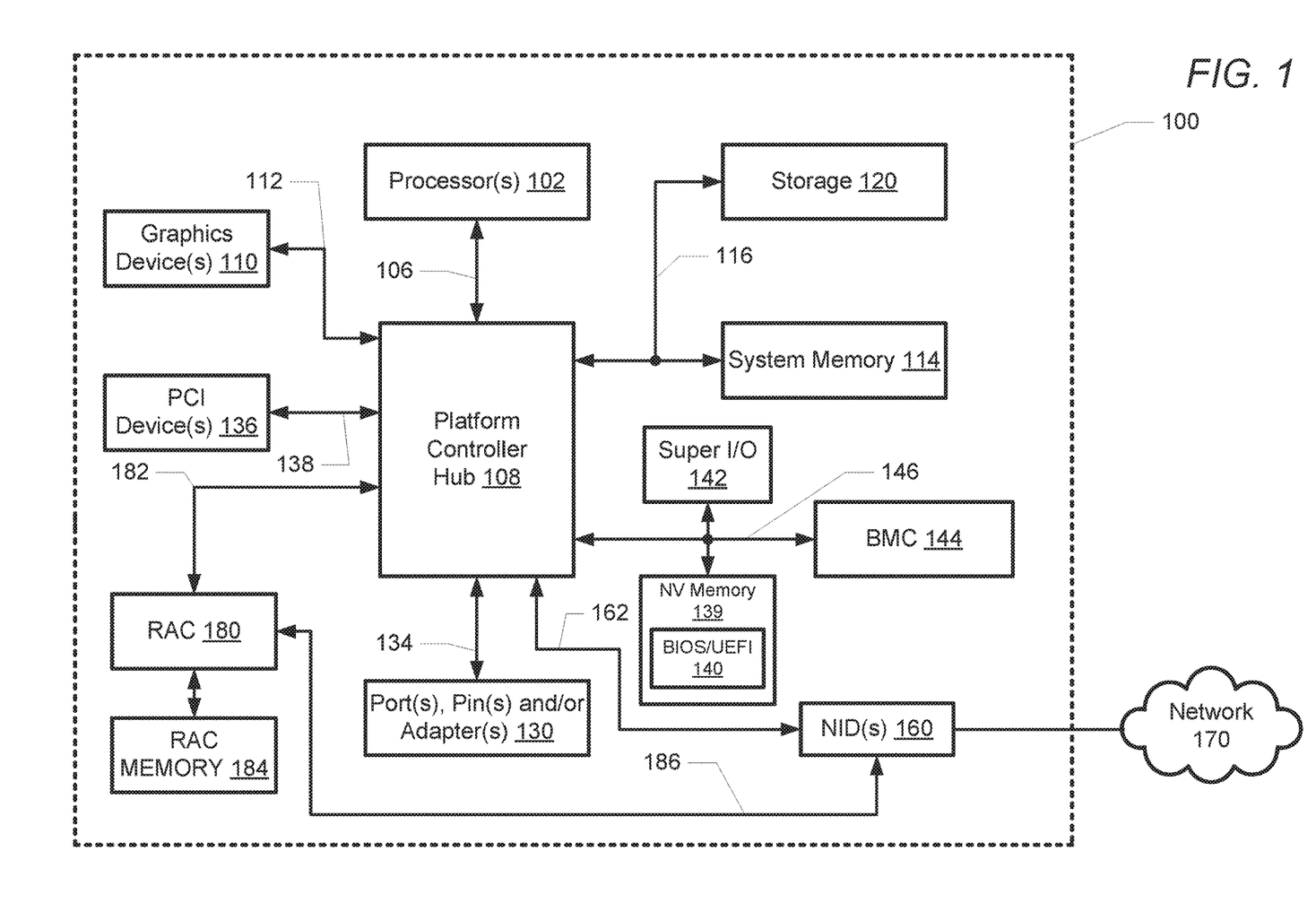
FIG. 1 illustrates one example of an IHS within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS 100 is shown. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor(s) 102 includes any processor capable of executing program instructions.

Processor(s) 102 are coupled to platform controller hub (PCH) or chipset 108 via front-side bus 106. PCH 108 may be configured to coordinate I/O traffic between processor(s) 102 and other components. For example, in this particular implementation, PCH 108 is coupled to various IHS components such as graphics device(s) 110 (e.g., one or more video cards or adaptors, etc.) via graphics bus 112 (e.g., an Accelerated Graphics Port or AGP bus, a Peripheral Component Interconnect (PCI) bus, etc.). PCH 108 is also coupled to system memory 114 via system bus 116. System memory 114 may be configured to store program instructions and/or data, accessible by processor(s) 102. In various embodiments, system memory 114 may be implemented using any suitable memory technology, such as static RAM (SRAM), synchronous dynamic RAM (SDRAM), nonvolatile/Flash-type memory, or any other type of memory.

PCH 108 is coupled by system bus 116 to a storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100.

PCH 108 is also coupled to one or more PCI devices 136 (e.g., modems, network cards, sound cards, video cards, shared memory etc.) via PCI bus 138. PCH 108 is further coupled to port(s), pin(s), and/or adapter(s) 130 over bus 134. Generally, PCH 108 may be configured to handle various I/O operations, and PCH 108 may provide interfaces such as, for instance, Universal Serial Bus (USB), audio, serial, parallel, Ethernet, and other interfaces, via port(s), pin(s), and/or adapter(s) 130 over bus 134. For example, PCH 108 may be configured to allow data to be exchanged between IHS 100 and other devices, such as other IHSs attached to a network. In various embodiments, PCH 108 may support communication via wired or wireless general data networks, such as any suitable type of Ethernet network, via telecommunications/telephony networks, such as analog voice networks or digital fiber communications networks, via storage area networks (SAN) such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. PCH 108 is coupled to a non-volatile (NV) storage or memory device 139 via Low Pin Count (LPC) bus 146. NV memory device 139 stores a basic input output system/unified extensible firmware interface (BIOS/UEFI) 140. PCH 108 is also coupled to super I/O Controller 142 and baseboard management controller (BMC) 144 via LPC bus 146.

BIOS/UEFI 140 includes program instructions stored thereon typically as BIOS or UEFI images. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

IHS 100 further includes a board management controller (BMC) 144 that is in communication with NV memory device 139 that can have program instructions stored thereon that are usable by processors(s) 102 to enable remote management of IHS 100. For example, BMC 144 may enable a user to discover, configure, and manage BMC 144, setup configuration options, resolve and administer hardware or software problems, etc. Additionally, or alternatively, BMC 144 may include one or more BMC firmware volumes, each volume having one or more firmware files used by the UEFI firmware interface to initialize and test components of IHS 100. Super I/O controller 142 combines interfaces for a variety of lower bandwidth or low data rate devices. Those devices may include, for example, floppy disks, parallel ports, a keyboard and mouse and other devices.

In some cases, IHS 100 may be configured to access different types of computer-accessible media separate from system memory 114. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108. Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

IHS 100 further includes one or more network interface devices (NID(s)) 160 coupled to PCH 108 via PCI bus 162. NID(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

IHS 100 further includes a remote access controller (RAC) 180 coupled via a PCI bus 182 to PCH 108. RAC 180 provides management functions that allow an administrator to deploy, monitor, manage, configure, update, troubleshoot and remediate IHS 100. RAC 180 is also coupled to a RAC memory device 184. In one embodiment, RAC memory 184 can be shared with processor(s) 102. RAC memory device 184 can be an NV memory device. RAC 180 is also communicatively coupled to NID(s) 160 via a sideband bus 186.

RAC 180 monitors and controls the operation of IHS 100 and other systems and devices communicatively coupled to IHS 100. RAC 180 can also perform configuration and remote control of other connected IHS s. Certain software and/or firmware modules stored in RAC memory 184 can be executed by RAC 180. Processor(s) 102 and RAC 180 include specific firmware that enables processor(s) 102 and RAC 180 to perform the various functions described herein.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In other implementations, one or more of the devices or components shown in FIG. 1 may be absent, or one or more other components may be added. Accordingly, systems and methods described herein may be implemented or executed with other computer system configurations. In addition, the operations performed by the illustrated components may, in some embodiments, be performed by fewer components or distributed across additional components. Similarly, in other embodiments, the operations of some of the illustrated components may not be performed and/or other additional operations may be available.

Figure 2:
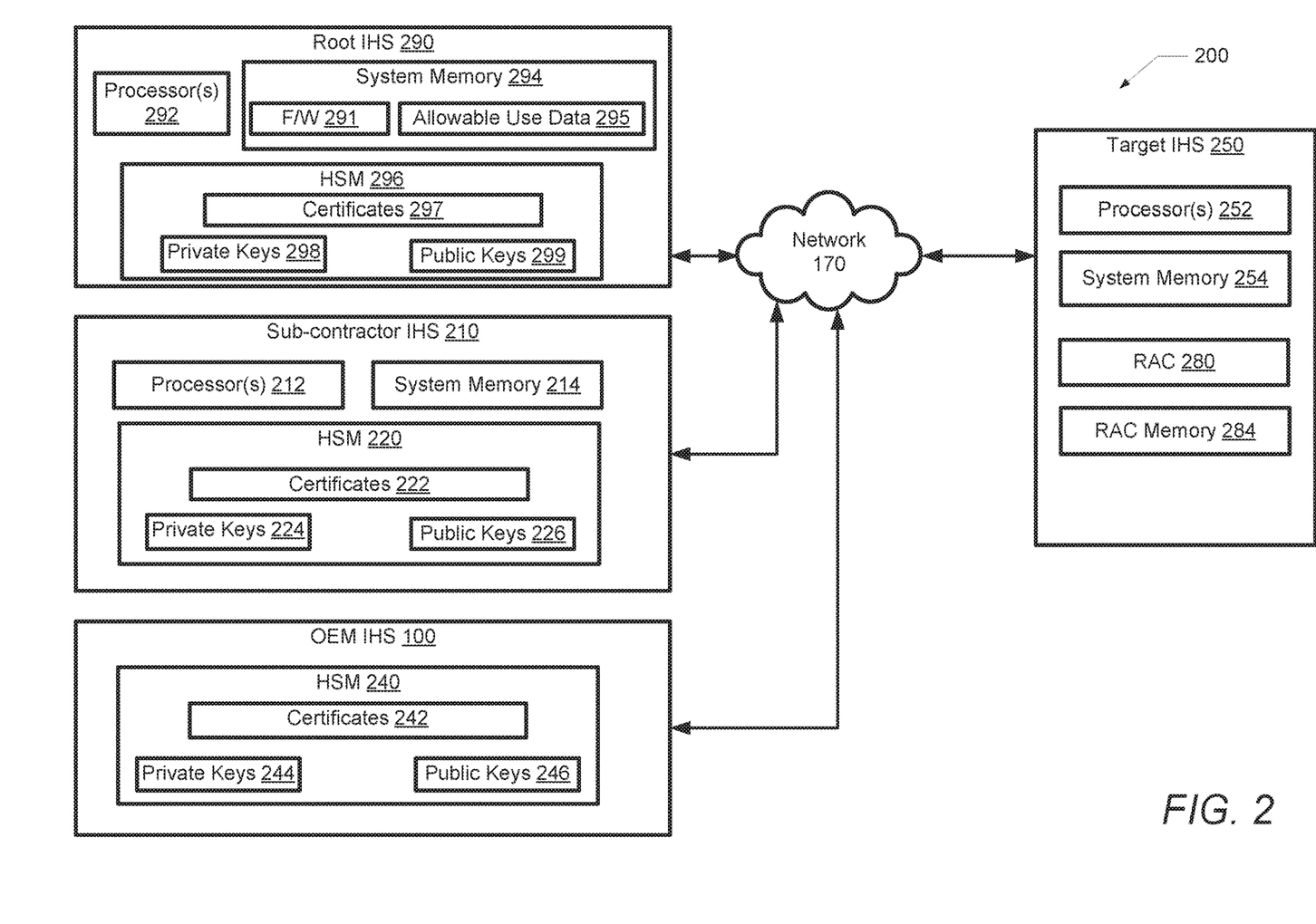
FIG. 2 illustrates an example networked computing system, in accordance with one embodiment.

With reference now to FIG. 2, one embodiment of a networked computing system 200 is shown. In the description of each of the following figures, reference is also made to specific components illustrated within the preceding figures, with similar or the same components sharing a same reference number. In one embodiment, IHS 100 can be an original equipment manufacturer (OEM) IHS. From here on, IHS 100 will be referred to as OEM IHS 100. The OEM IHS is controlled by the original designer and manufacture of a product or software and therefore is a trusted IHS. Networked computing system 200 includes Root IHS 290, OEM IHS 100, a sub-contractor IHS 210 and a target IHS 250. Root IHS 290, OEM IHS 100, sub-contractor IHS 210 and target IHS 250 are communicatively coupled to each over via network 170. In another embodiment, root IHS 290, OEM IHS 100, sub-contractor IHS 210 and target IHS 250 can be communicatively coupled to each other via a direct connection. In one embodiment, root IHS 290, sub-contractor IHS 210 and target IHS 250 can have the same architecture and design features as OEM IHS 100. Sub-contractor IHS 210 can be remotely located in a sub-contractor factory that produces customer or target IHSs 250 that are sold to customers. Sub-contractor IHS 210 is not controlled by the original designer and manufacture of a product or software and therefore is not a trusted IHS. During manufacturing, target IHS 250 can be loaded with software that requires a license key for activation. Target IHS 250 includes processor(s) 252, system memory 254, RAC 280 and RAC memory 284.

Root IHS 290 includes processor(s) 292 and a system memory 294. System memory 294 contains F/W 291 and allowable use data 295. F/W 291 enables allowable use data to be embedded within a certificate. Allowable use data 295 contains information about the purpose and allowable uses that are used to determine if a license can be installed on target IHS 250. Allowable use data 295 is pre-determined and is used during a provisioning process of certificates by root IHS 290. Root IHS 290 further includes a hardware security module (HSM) 296. HSM 296 is a physical computing device that safeguards and manages digital keys for strong authentication and cryptographic processing. HSM 296 is communicatively coupled to the other components of root IHS 290. HSM 296 can generate and store certificates 297, private keys 298 and public keys 299. In an embodiment, HSM 296 can be a root certificate authority (CA) that generates certificates 297, private keys 298 and public keys 299.

Sub-contractor IHS 210 includes processor(s) 212 and a system memory 214. Sub-contractor IHS 210 further includes a hardware security module (HSM) 220. HSM 220 is a physical computing device that safeguards and manages digital keys for strong authentication and cryptographic processing. HSM 220 is communicatively coupled to the other components of sub-contractor IHS 210. In one embodiment, HSM 220 can receive and store certificates 222, private keys 224 and public keys 226 received from root IHS 290. In another embodiment, HSM 240 can be an intermediate certificate authority (CA) that can issue certificates. HSM 220 can enable public key infrastructure (PKI) between sub-contractor IHS 210 and target IHS 250.

OEM IHS 100 further includes a hardware security module (HSM) 240. HSM 240 is a physical computing device that safeguards and manages digital keys for strong authentication and cryptographic processing. HSM 240 is communicatively coupled to the other components of OEM IHS 100. HSM 240 can receive and store certificates 242, private keys 244 and public keys 246 received from root IHS 290. In one embodiment, HSM 240 can be an intermediate CA. In another embodiment, HSM 240 can be an intermediate CA that issues certificates. HSM 240 can enable public key infrastructure (PKI) between OEM IHS 100 and target IHS 250.

PKI is a set of policies, and procedures to create, manage, distribute, use, store, and revoke digital certificates and manage public-key encryption. The purpose of PKI is to facilitate the secure electronic transfer of information for a range of network activities. It is required for activities where simple passwords are an inadequate authentication method and more rigorous proof is required to confirm the identity of the parties involved in the communication and to validate the information being transferred. Certificates 297, 222 and 242 are a digital form of identification. Certificates 297, 222 and 242 are a digital credential that provides information about the identity of an entity as well as other supporting information. Certificates are issued by an authority, referred to as a certificate authority (CA). A certificate that is issued by a CA guarantees the validity of the information in the certificate. In one embodiment a certificate is valid for only a specific period of time.

Certificates provide support for public key cryptography because certificates contain the public key of the entity identified in the certificate. Because the certificate matches a public key to a particular individual, and that certificate's authenticity is guaranteed by the issuer, the digital certificate provides a solution to the problem of how to find a user's public key and know that it is valid. These problems are solved by a user obtaining another user's public key from the certificate. The user knows it is valid because a trusted certification authority has issued the certificate. In addition, certificates rely on public key cryptography for their own authentication. When a certificate is issued, the issuing certification authority signs the certificate with its own private key. To validate the authenticity of a certificate, a user can obtain the certification authority's public key and use it against the certificate to determine if it was signed by the certification authority.

Figure 3A:
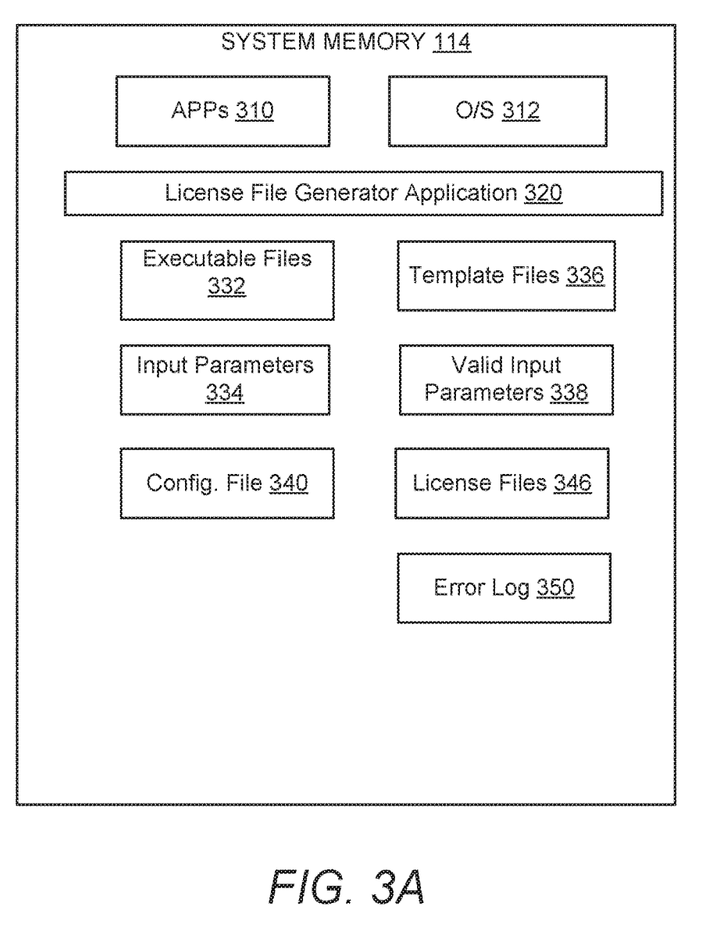
FIG. 3A illustrates example contents of a system memory in an IHS, in accordance with one embodiment.

Referring to FIG. 3A, one embodiment of example contents of system memory 114 of OEM IHS 100 is shown. System memory 114 includes data, software, and/or firmware modules, including application(s) 310 and operating system (O/S) 312. System memory 114 can also include other data, software, and/or firmware modules. System memory 114 also includes license file generator software or application 320. License file generator application 320 enables the generation of license files and keys that include allowable use data for one or more hardware or software products. License file generator application 320 can produce license keys and can supply the license keys to customer or target IHS 250. In one embodiment, license file generator application 320 performs the processes presented in the flowchart of FIGS. 5A and B.

System memory 114 further includes executable files 332, input parameters 334, template files 336, valid input parameters 338, configuration file 340, license files 346 and error log 350. Executable files 332 are programs that are controlled by license file generator application 320 to create license data and allowable use data for specific particular products (i.e. software and/or firmware products). Executable files 332 contain code that can generate license data and allowable use data when the code is supplied the necessary information as inputs. The code in executable files 332 may consist of executable files in an OS. In one embodiment, the code may be called with a command line command and the input may be supplied as parameters to the command line. Input parameters 334 contain the specific order details required to fulfill a factory or user order. In one embodiment, input parameters 334 can include a template file name/location, service tag, entitlement identifier, date/time, output file name/location, device identification, IHS identification/location and product description/type.

Template files 336 contain templates that describe the information needed to generate license data and allowable use data, including information about the process of license and allowable use data generation and sources of data used as input to code to generate license data and allowable use data. In an embodiment, the template information includes variables that designate parameters available for orders such as part numbers, quantity and number of virtual machines included in an order. The template can also include the name of the executable file that creates license data and allowable use data for particular products and a file name to store the data once generated. Valid input parameters 338 are predetermined values or range of values for the input parameters 334 that are acceptable.

Configuration file 340 contains initial parameters and settings for computer programs and is used for user applications, IHS processes and operating system settings. License files 346 are the files generated by license file generator application 320. License files 346 contain license data, allowable use data and other information as will be described later. Error log 350 contains error messages generated by processor(s) 102 when problems or errors occur during the generation of license files by processor(s) 102.

Figure 3B:
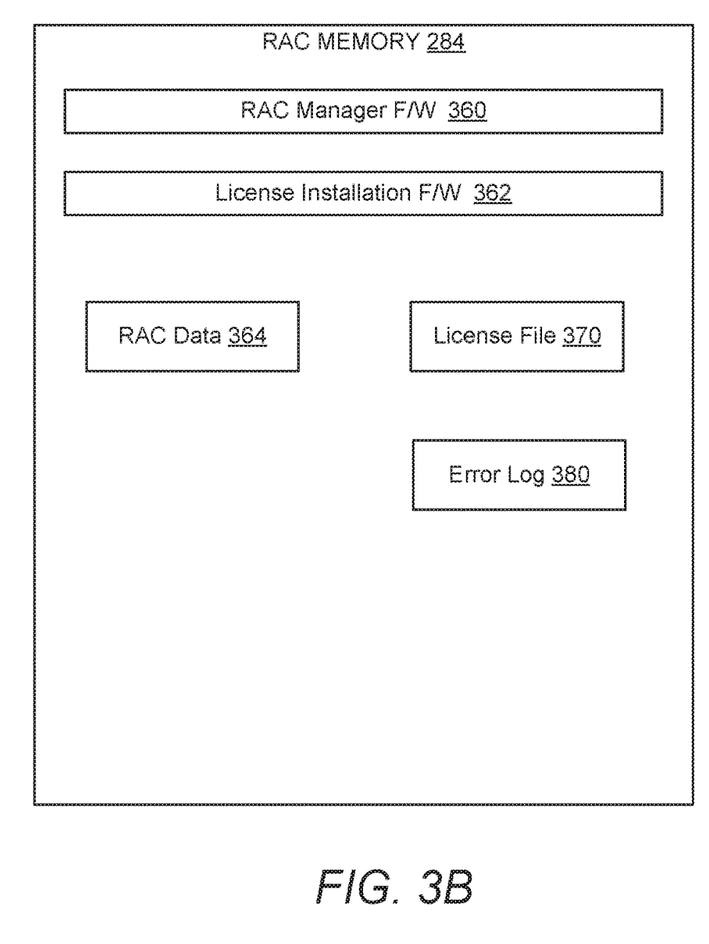
FIG. 3B illustrates example contents of a remote access controller memory device, in accordance with one embodiment.

Turning to FIG. 3B, one embodiment of example contents of RAC memory 284 of target IHS 250 is shown. RAC memory 284 includes RAC manager firmware (F/W) 360 and license installation F/W 362. RAC manager F/W 360 allows an administrator to deploy, monitor, manage, configure, update, troubleshoot and remediate target IHS 250. License installation F/W 362 enables the allowable uses or purpose of a license to be determined from a license file and determines if the license is permitted to be installed on a specific IHS. In one embodiment, license installation F/W 362 can determine if a license for RAC manager F/W 360 is permitted to be installed on target IHS 250. In another embodiment, license installation F/W 362 can determine if a license for certain features or functions of RAC manager F/W 360 is permitted to be installed on target IHS 250. In an embodiment, license installation F/W 362 performs one or more of the processes presented in the flowchart of FIG. 6. It is appreciated that one or more of the described processes can be performed by another processing component (e.g., processors (102)) executing different programs/modules/code within an information handling system.

RAC memory 284 further includes RAC data 364, license files 370 and error log 380. RAC data 364 contains data about the identification/location of target IHS 250 and the current type and revision of RAC manager firmware (F/W) 360. License files 370 are received from OEM IHS 100 and are stored to RAC memory 284 if the license for the target IHS is allowed as determined by license installation F/W 362. Error log 380 stores error messages generated by RAC 280 when problems or errors occur during the execution of license installation F/W 362.

Figure 4A:
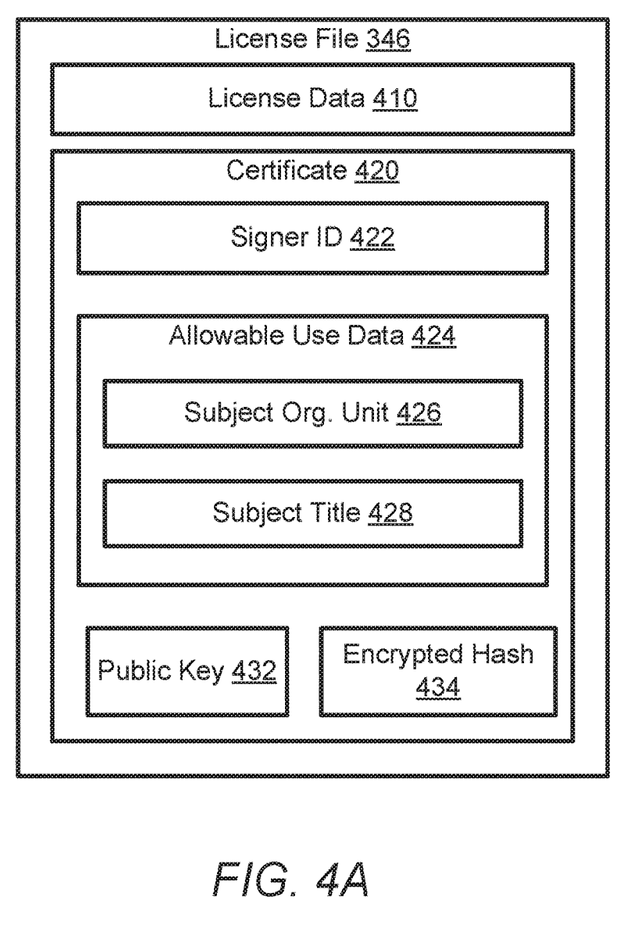
FIG. 4A illustrates one example of a license file, in accordance with one embodiment.

FIG. 4A illustrates further details of a license file 346. License file 346 can include license data 410 and certificate 420. License data 410 contains information about the hardware and/or software that is being licensed to a customer. Certificate 420 contains signer identity 422, allowable use data 424, license or public key 432 and fingerprint or encrypted hash 434. Signer identity 422 includes information about the identity of the signer of the certificate. In one embodiment, signer identity 422 can be the specific name of the IHS that signed the certificate (i.e. OEM IHS 100 or sub-contractor IHS 210). Allowable use data 424 contains information about the purpose and allowed installations to determine if a license can be installed on target IHS 250. Allowable use data 424 includes subject organizational unit 426 and subject title 428. Public key 432 allows the contents of license file 346 to be verified by one who has access to the public key. The verification proves that the sender had access to the private key, and therefore is to be a trusted entity. Encrypted hash 434 is the hash of license file 346 that is generated by a hash function and encrypted and is used to sign the certificate. The encrypted hash is later used by target IHS 250 to verify that the license file 346 has not been tampered with.

Figure 4B:
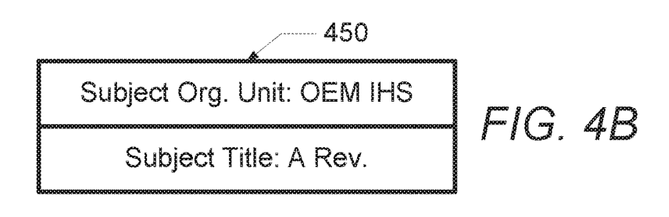
FIG. 4B illustrates one example of allowable use data, in accordance with one embodiment.
Figure 4C:
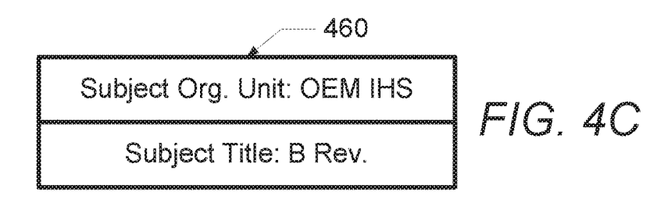
FIG. 4C illustrates another example of allowable use data, in accordance with one embodiment.

FIG. 4B illustrates allowable use data 450. In allowable use data 450, the subject organizational unit is specified as an OEM IHS and the subject title is specified as A revision firmware. Referring to FIG. 4C allowable use data 460 is shown. In allowable use data 460, the subject organizational unit is specified as an OEM IHS and the subject title is specified as B revision firmware.

Figure 4D:
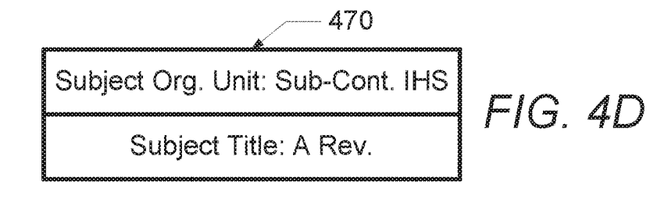
FIG. 4D illustrates an additional example of allowable use data, in accordance with one embodiment.
Figure 4E:
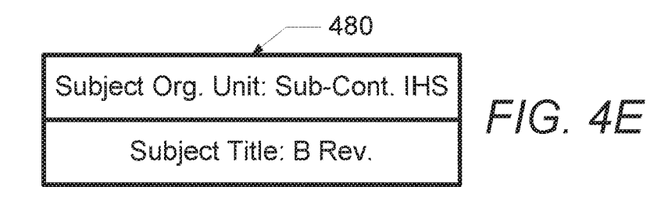
FIG. 4E illustrates one more example of allowable use data, in accordance with one embodiment.

FIG. 4D illustrates allowable use data 470. In allowable use data 470, the subject organizational unit is specified as a sub-contractor IHS and the subject title is specified as A revision firmware. Turning to FIG. 4E allowable use data 480 is shown. In allowable use data 480, the subject organizational unit is specified as a sub-contractor IHS and the subject title is specified as B revision firmware.

In one embodiment, processor 102 of IHS 100 retrieves a plurality of input parameters 334 associated with a product and generates license data 410 and allowable use data 424 at least partially based on the input parameters. The allowable use data at least partially identifies a permitted installation of a license for the product. The license data and the allowable use data are transmitted to a hardware security module (HSM) 240 and the HSM is triggered to embed the allowable use data and signer identity 422 within certificate 420. The method further includes triggering the HSM to sign the certificate using a private key 244 and receiving a signed certificate from the HSM. A license file 346 is generated including the license data and the signed certificate. The license file is transmitted to a second IHS 250. By embedding the allowable data within the certificate, a license can remain the same for several customer or target IHSs while, permitted users of the license are identified by the allowable use data and the signing identifier.

FIGS. 5, 6A-B and 7 illustrate flowcharts of exemplary methods 500, 600 and 700 by which processor 292, processor 102 and RAC 280 within the preceding figures performs different aspects of the processes that enable the one or more embodiments of the disclosure. Generally, method 500 represents a method for embedding or inserting allowable use data into a certificate. Generally, method 600 represents a method for generating a license file including a certificate containing embedded allowable use data for the license. Method 700 represents a method for determining if a license is permitted to be installed at a target IHS based on the embedded allowable use data.

The description of methods 500, 600 and 700 is provided with general reference to the specific components illustrated within the preceding FIGS. 1-4E. Method 500 is performed by root IHS 290 during the issuance of certificates which can then be transmitted to OEM IHS 100 or sub-contractor IHS 210. Method 500 is described as being implemented via processor(s) 292 and particularly the execution of code provided F/W 291. Method 600 is performed by OEM IHS 100 during the generation of license files which can then be transmitted to customer or target IHS 250. In another embodiment, method 600 can be performed by sub-contractor IHS 210 during the generation of license files which can then be transmitted to customer or target IHS 250. Method 600 is described as being implemented via processor(s) 102 and particularly the execution of code provided by license file generator application 320 within processor(s) 102. Method 700 is performed by target IHS 250. Method 700 is described as being implemented via RAC 280 and particularly the execution of code provided by license installation F/W 362 within RAC 280. It is however appreciated that certain aspects of the described methods may be implemented via other processing devices and/or execution of other code.

Figure 5:
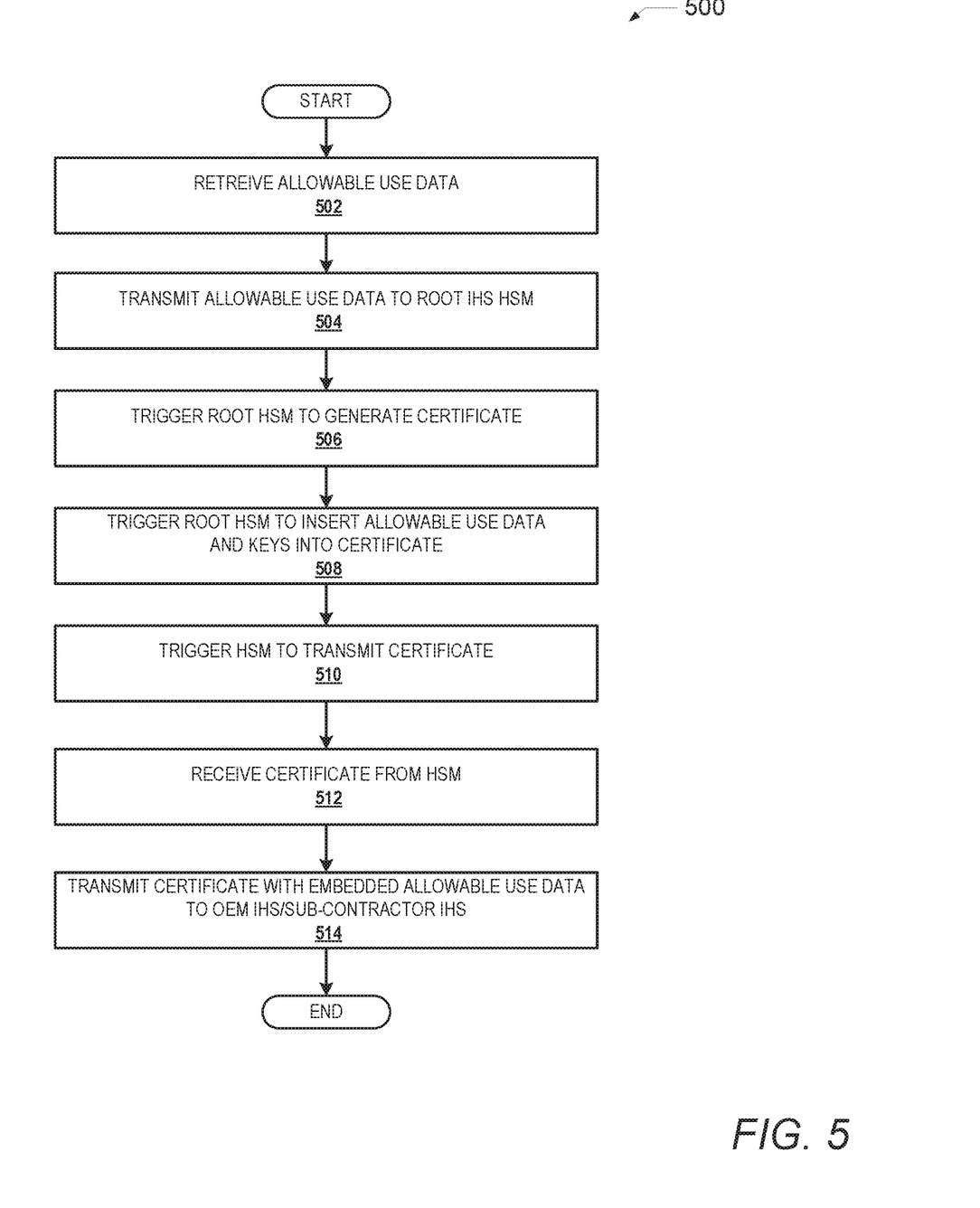
FIG. 5 is a flow chart illustrating one example of a method for embedding allowable use data into a certificate during a provisioning process, according to one or more embodiments.

Referring to the flow chart of FIG. 5, method 500 begins at the start block and proceeds to block 502 where processor 292 retrieves allowable use data 295 from system memory 114 and transmits the allowable use data to HSM 296 (block 504). Processor 292 triggers root HSM 296 to generate certificate 297 (block 506). Processor 292 triggers root HSM 296 to embed or insert the allowable use data 295 and the public and private keys 298, 299 into certificate 297 (block 508). Processor 292 triggers root HSM 296 to transmit the certificate 297 to processor 292 (block 510). Processor 292 receives the certificate 297 from root HSM 296 (block 512). Processor 292 transmits certificate 297 including the allowable use data to one or both of OEM IHS 100 and sub-contractor IHS 210 (block 514). Method 500 then concludes at the end block.

Figure 6A:
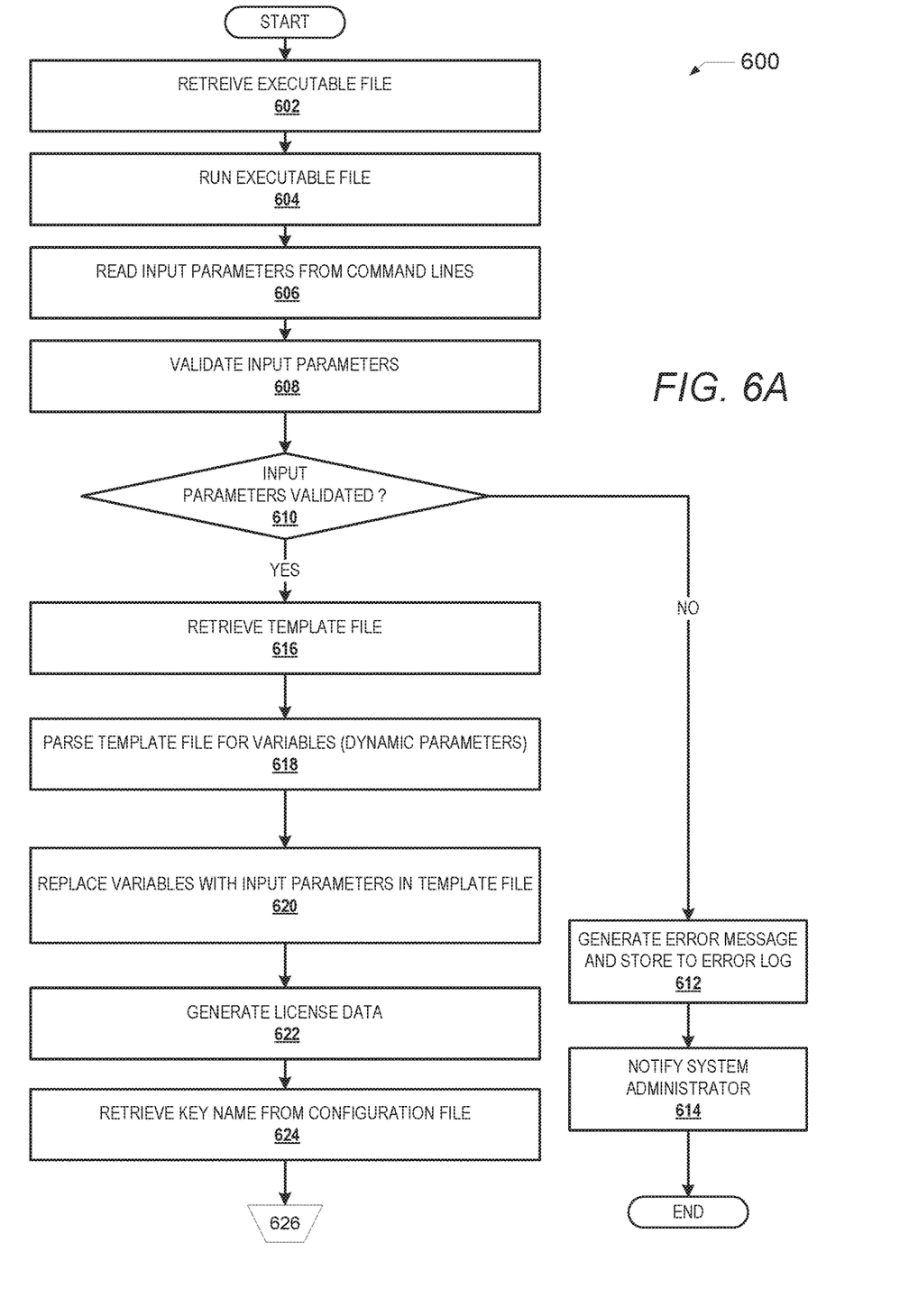
FIGS. 6A and B is a flow chart illustrating one example of a method for generating a license file including a certificate containing embedded allowable use data and a signer identifier, according to one or more embodiments.

Referring to the flow chart of FIG. 6A, method 600 begins at the start block and proceeds to block 602 where processor 102 retrieves an executable file 332 from system memory 114. Processor 102 runs the executable file (block 604) and reads input parameters 334 from commands lines of the executable file 332 (block 606). Processor 102 validates the input parameters by comparing the input parameters 334 to the pre-determined valid input parameters 338 (block 608). Processor 102 determines if the input parameters 334 are valid input parameters (decision block 610). In response to the input parameters not being valid, processor 102 generates a first type error message and stores the first type error message to error log 350 (block 612). Processor 102 notifies a system administrator that a first type error message has occurred (block 614). Method 600 then concludes at the end block.

In response to the input parameters being valid, processor 102 retrieves a template file 336 from system memory 114 (block 616) and parses the template file for the variables or dynamic parameters (block 618). Processor 102 replaces the variables in the template file with the input parameters 334 (block 620). Processor 102 generates the license data 410 based on the input parameter values in the template file (block 622). Processor 102 retrieves the key name from configuration file 340 (block 624).

Figure 6B:
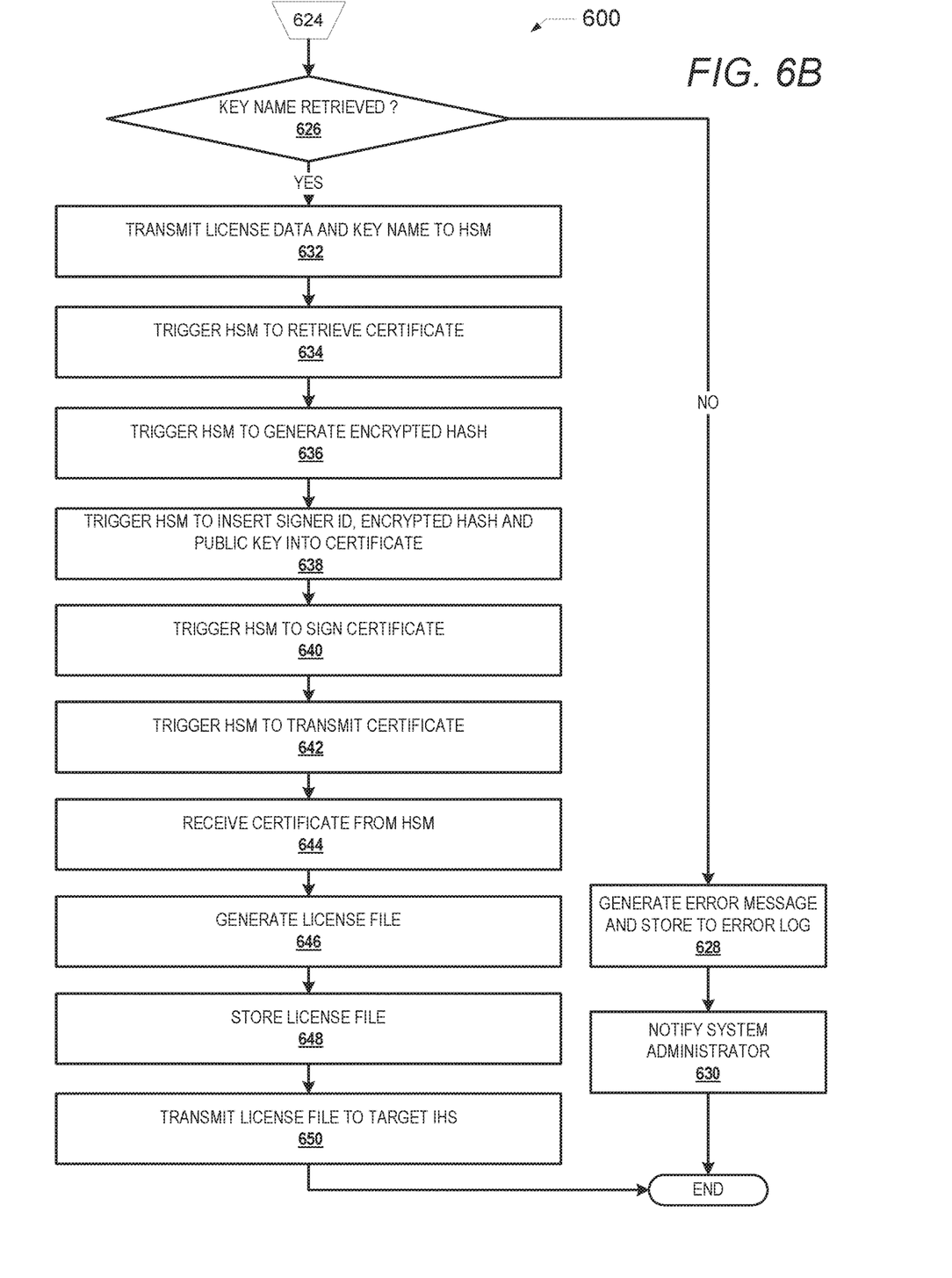

Turning to FIG. 6B, processor 102 determines if the key name has been retrieved (decision block 626). In response to the key name not being retrieved, processor 102 generates a second type error message and stores the second type error message to error log 350 (block 628). Processor 102 notifies a system administrator that a second type error message has occurred (block 630). Method 600 then ends. In response to the key name being retrieved, processor 102 transmits license data 410 and the key name to HSM 240 (block 632). Processor 102 triggers HSM 240 to retrieve one of the previously provisioned certificates (block 634). In one embodiment, certificates are received by HSM 240 from root IHS 290 and are stored by HSM 240. The certificates include the pre-provisioned allowable use data 424 and a public key and a private key (public key/private key pair). In one embodiment, the specific certificate retrieved by HSM 240 is at least partially based on the input parameters. For example, if the input parameters specify that the license is for B revision firmware, the certificate retrieved can correspond to a subject title of B revision firmware.

Processor 102 triggers HSM 240 to generate a fingerprint or encrypted hash 434 of the license data 410 (block 636). In one embodiment, encrypted hash 434 is calculated by a secure hash algorithm (SHA). Processor 102 triggers HSM 240 to insert signer identity 422, encrypted hash 434 and public key 432 into certificate 420 and to remove private key 244 (block 638). The signer identity 422 is the name of the IHS that signs the certificate (i.e. OEM IHS 100). Processor 102 triggers HSM 240 to sign certificate 420 using the private key 244 (block 640) and triggers HSM 240 to transmit the signed certificate to processor 102 (block 642).

Processor 102 receives the signed certificate 420 from HSM 220 (block 644) and generates license file 346 by appending certificate 420 to license data 410 (block 646). Processor 102 stores license file 346 to system memory 114 (block 648) and transmits the license file to target IHS 250 (block 650). Method 600 then ends. By embedding the allowable data within the certificate, a license can remain the same for several customer or target IHSs while, permitted users of the license are identified by the allowable use data and the signing identifier.

Figure 7:
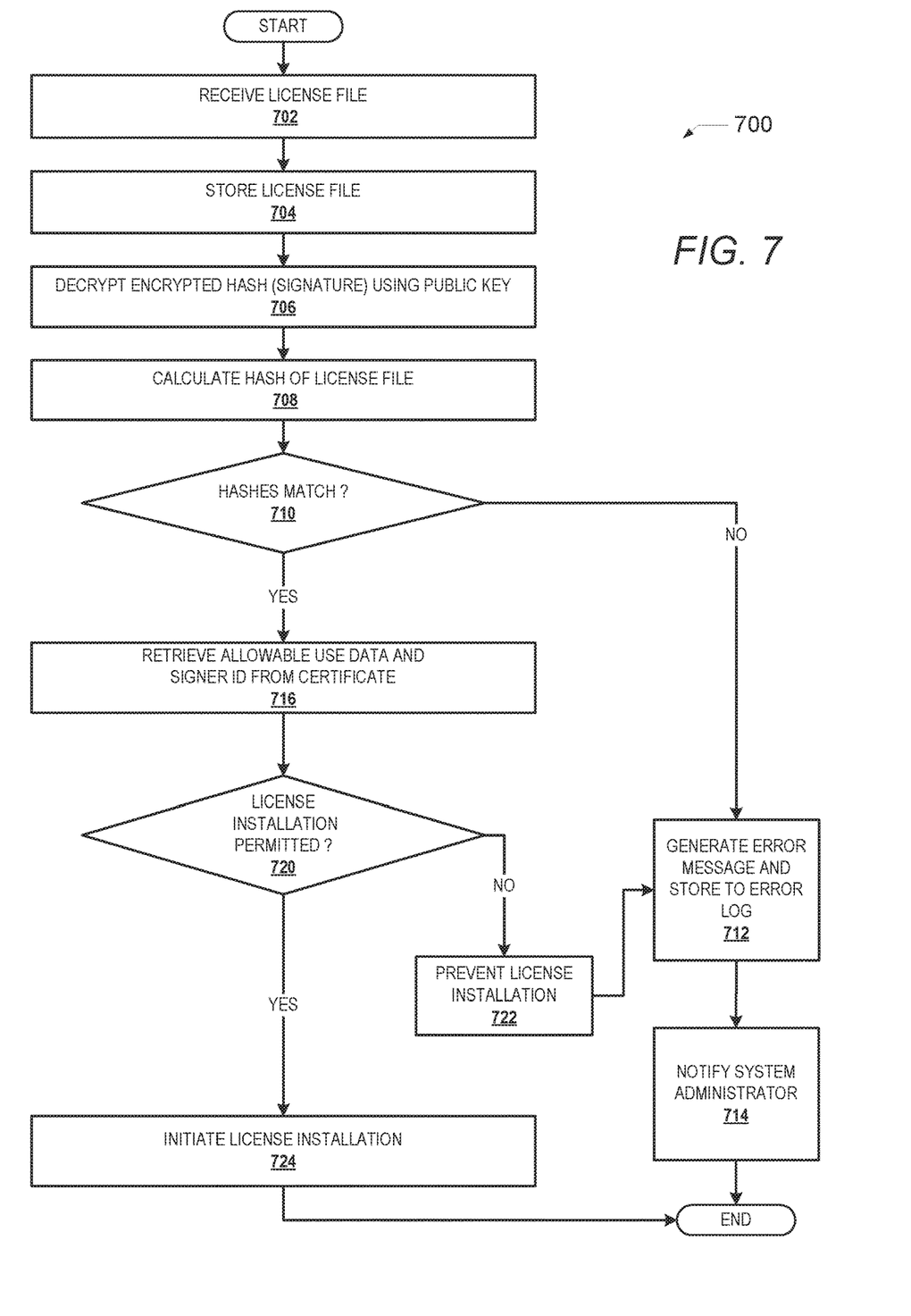
FIG. 7 is a flow chart illustrating one example of a method for determining if a license is allowed to be installed at a target IHS, according to one or more embodiments.

FIG. 7 illustrates a method for determining if a license is permitted to be installed at a target IHS based on embedded allowable use data. Method 700 begins at the start block and proceeds to block 702 where RAC 280 of target IHS 250 receives a license file from either OEM IHS 100 or sub-contractor IHS 210. RAC 280 stores license file 370 to RAC memory 284 (block 704). RAC 280 decrypts encrypted hash 434 using the public key 432 (block 706) and calculates a hash of the license file 370 (block 708).

At decision block 710, RAC 280 determines if the encrypted hash 434 matches the calculated hash. In response to the hashes not matching, RAC 280 generates a third type error message and stores the third type error message to error log 380 (block 712). The third type error message includes the reason for failing validation which is because the encrypted hash was not authenticated. RAC 280 sends a notice to a system administrator that a license file validation error has occurred (block 714). Method 700 then ends. In response to the hashes matching at decision block 710, RAC 280 retrieves allowable use data 424 and signer identity 422 from certificate 420 (block 716).

At decision block 720, RAC 280 determines if a license containing license data 410 is permitted to be installed on target IHS 250. RAC 280 determines if the license is permitted to be installed on target IHS 250 by comparing allowable use data 424 and signer identity 422. For example, if the signer identity is OEM IHS and the allowable use data is allowable use data 460 (FIG. 4C), a license for RAC manager F/W 360 is permitted to be installed because a license is permitted for B rev. firmware where the certificate is signed (signer ID) by the OEM IHS. According to another example, if the signer identity is sub-contractor IHS and the allowable use data is allowable use data 470 (FIG. 4D), a license for RAC manager F/W 360 is not permitted to be installed because a license is not permitted for A rev. firmware where the certificate is signed (signer ID) by the sub-contractor IHS.

In response to determining that the license installation is not permitted, RAC 280 prevents the license from being installed (block 722) and generates a fourth type error message and stores the fourth type error message to error log 380 (block 712). The fourth type error message indicates the license installation for RAC manager F/W 360 has not been permitted. RAC 280 sends a notice to a system administrator that the fourth type error has occurred (block 714). In response to determining that the license installation is permitted, RAC 280 initiates installation of the license (block 724). In one embodiment, initiating installation of the license comprises initiation of the running or execution of a license generator program. Method 700 then concludes at the end block. By embedding the allowable data within the certificate, a license can remain the same for several customer or target IHSs while, permitted users of the license are identified by the allowable use data and the signing identifier.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for generating a license file, the method comprising:
   receiving, via a processor of a first information handling system (IHS), a plurality of input parameters associated with a product;
   generating license data at least partially based on the input parameters;
   transmitting the license data to a hardware security module (HSM);
   triggering the HSM to retrieve a certificate containing allowable use data, the allowable use data including a subject organizational unit and a subject title, the subject organizational unit being one of an OEM IHS and a sub-contractor IHS, and the allowable use data at least partially identifying a permitted installation of a license for the product and utilized to determine if the license can be installed on a target IHS;
   triggering the HSM to embed a signer identifier within the certificate, the signer identifier being a name of the first IHS;
   triggering the HSM to sign the certificate using using a private key, the private key being generated along with a corresponding public key that is embedded in the certificate;
   receiving the signed certificate from the HSM;
   generating a license file including the license data and the signed certificate, wherein the signed certificate comprises the allowable use data and the public key; and
   transmitting the license file to a second IHS wherein:
      the second IHS uses the allowable use data and the signer identifier to determine if installation of the license is permitted on the second IHS;
      the public key allows contents of the license file to be verified as generated from a sender with access to the private key, and is therefore a trusted entity; and
   in response to determining that installation of the license is permitted on the second IHS, the second IHS initiating installation of the license on the second IHS.

2. The method of claim 1, further comprising:
   during a provisioning process:
      triggering a root HSM, via a root processor of a root IHS, to retrieve the allowable use data;
      triggering the root HSM to embed the allowable use data into the certificate;
      receiving the certificate containing the embedded allowable use data; and
      transmitting the certificate including the embedded allowable use data to the first IHS.

3. The method of claim 1, wherein the allowable use data being embedded within the certificate enables a license to remain a same for several customers or target IHSs, while permitted users of the license are identified by the allowable use data and the signer identifier.

4. The method of claim 3, wherein the second IHS using the allowable use data and the signer identifier to determine if installation of the license is permitted on the second IHS, further comprises:
   receiving, via a controller of the second IHS, the license file from the first IHS;
   calculating a first hash of the license file;
   decrypting an encrypted second hash from the certificate using a public key;
   determining if the first hash and the second hash match; and
   in response to the first hash and the second hash matching:
      retrieving the allowable use data and the signer identifier from the certificate; and
      determining if installation of the license is permitted on the second IHS based on the allowable use data and the signer identifier.

5. The method of claim 4 further comprising:
   in response to determining that installation of the license is not permitted on the second IHS, preventing installation of the license on the second IHS.

6. The method of claim 1, further comprising:
   retrieving a first executable file and a first template file;
   executing the first executable file;
   retrieving the input parameters by calling code from a plurality of command lines of the first executable file, the first template file describing a format of the command lines, the format including a specification of a placement in the command lines of values for a plurality of variables contained in the first template file;
   parsing the first template file;
   replacing the variables contained in the template file with the values of the input parameters; and
   generating the license data at least partially based on the input parameters.

7. An information handling system (IHS) comprising:
   a processor of a first IHS communicatively coupled to a first memory device and to a hardware security module (HSM), the processor having software executing thereon for generating a license file, wherein the software configures the processor to:
   receive a plurality of input parameters associated with a product;
   generate license data at least partially based on the input parameters;
   transmit the license data to a hardware security module (HSM);
   trigger the HSM to retrieve a certificate containing allowable use data, the allowable use data including a subject organizational unit and a subject title, the subject organizational unit being one of an OEM IHS and a sub-contractor IHS, and the allowable use data at least partially identifying a permitted installation of a license for the product and utilized to determine if the license can be installed on a target IHS;
   trigger the HSM to embed a signer identifier within the certificate, the signer identifier being a name of the first IHS;
   trigger the HSM to sign the certificate using a private key, the private key being generated along with a corresponding public key that is embedded in the certificate;
   receive the signed certificate from the HSM;

generate a license file including the license data and the signed certificate, wherein the signed certificate comprises the allowable use data and the public key; and
transmit the license file to a second IHS wherein:
the second IHS uses the allowable use data and the signer identifier to determine if installation of the license is permitted on the second IHS;
the public key allows contents of the license file to be verified as generated from a sender with access to the private key, and is therefore a trusted entity; and
in response to determining that installation of the license is permitted on the second IHS, the second IHS initiates installation of the license on the second IHS.

8. The information handling system of claim 7, wherein during a provisioning process a root processor of a root IHS:
triggers a root HSM to retrieve the allowable use data;
triggers the root HSM to embed the allowable use data into the certificate;
receives the certificate containing the embedded allowable use data; and
transmits the certificate including the embedded allowable use data to the first IHS.

9. The information handling system method of claim 7, wherein embedding the allowable use data within the certificate enables a license to remain a same for several customers or target IHSs while permitted users of the license are identified by the allowable use data and the signer identifier.

10. The information handling system of claim 9, wherein the second IHS includes a controller communicatively coupled to a second memory device, the controller having firmware executing thereon, wherein the firmware configures the controller to:
receive the license file from the first IHS;
calculate a first hash of the license file;
decrypt an encrypted second hash from the certificate using a public key;
determine if the first hash and the second hash match; and
in response to the first hash and the second hash matching:
retrieve the allowable use data and the signer identifier from the certificate; and
determine if installation of the license is permitted on the second IHS based on the allowable use data and the signer identifier.

11. The information handling system of claim 10, wherein the firmware further configures the controller to:
in response to determining that installation of the license is not permitted on the second IHS, prevent installation of the license on the second IHS.

12. The information handling system of claim 7, wherein the software further configures the processor to:
retrieve a first executable file and a first template file;
execute the first executable file;
retrieve the input parameters by calling code from a plurality of command lines of the first executable file, the first template file describing a format of the command lines, the format including a specification of a placement in the command lines of values for a plurality of variables contained in the first template file;
parse the first template file;
replace the variables contained in the template file with the values of the input parameters; and
generate the license data at least partially based on the input parameters.

13. A license file generation system comprising:
a processor of a first information handling system (IHS) communicatively coupled to a first memory device and to a hardware security module (HSM), the processor having software executing thereon for generating a license file, wherein the software configures the processor to:
receive a plurality of input parameters associated with a product;
generate license data at least partially based on the input parameters;
transmit the license data to a hardware security module (HSM);
trigger the HSM to retrieve a certificate containing allowable use data, the allowable use data including a subject organizational unit and a subject title, the subject organizational unit being one of an OEM IHS and a sub-contractor IHS, and the allowable use data at least partially identifying a permitted installation of a license for the product and utilized to determine if the license can be installed on a target IHS;
trigger the HSM to embed a signer identifier within the certificate, the signer identifier being a name of the first IHS;
trigger the HSM to sign the certificate using a private key, the private key being generated along with a corresponding public key that is embedded in the certificate;
receive the signed certificate from the HSM;
generate a license file including the license data and the signed certificate, wherein the signed certificate comprises the allowable use data and the public key; and
transmit the license file to a second IHS, wherein:
the second IHS uses the allowable use data and the signer identifier to determine if installation of the license is permitted on the second IHS;
the public key allows contents of the license file to be verified as generated from a sender with access to the private key, and is therefore a trusted entity; and
in response to determining that installation of the license is permitted on the second IHS, the second IHS initiates installation of the license on the second IHS.

14. The license file generation system of claim 13, wherein during a provisioning process, a root processor of a root IHS:
triggers a root HSM to retrieve the allowable use data;
triggers the root HSM to embed the allowable use data into the certificate;
receives the certificate containing the embedded allowable use data; and
transmits the certificate including the embedded allowable use data to the first IHS.

15. The license file generation system of claim 13, wherein embedding the allowable use data within the certificate enables a license to remain a same for several customers or target IHS s while permitted users of the license are identified by the allowable use data and the signer identifier.

16. The license file generation system of claim 15, wherein the second IHS includes a controller communicatively coupled to a second memory device, the controller having firmware executing thereon, wherein the firmware configures the controller to:
receive the license file from the first IHS;
calculate a first hash of the license file;
decrypt an encrypted second hash from the certificate using a public key;

determine if the first hash and the second hash match; and
in response to the first hash and the second hash matching:
- retrieve the allowable use data and the signer identifier from the certificate; and
- determine if installation of the license is permitted on the second IHS based on the allowable use data and the signer identifier.

17. The license file generation information handling system of claim 16, wherein the firmware further configures the controller to:
in response to determining that installation of the license is not permitted on the second IHS, prevent installation of the license on the second IHS.

18. The license file generation information handling system of claim 16, wherein the firmware further configures the controller to:
retrieve a first executable file and a first template file;
execute the first executable file;
retrieve the input parameters by calling code from a plurality of command lines of the first executable file, the first template file describing a format of the command lines, the format including a specification of a placement in the command lines of values for a plurality of variables contained in the first template file;
parse the first template file;
replace the variables contained in the template file with the values of the input parameters; and
generate the license data at least partially based on the input parameters.

* * * * *